(12) United States Patent
Zhou et al.

(10) Patent No.: US 6,473,265 B1
(45) Date of Patent: Oct. 29, 2002

(54) HIGH FREQUENCY WRITER WITH SLICED CORE TOPOLOGY

(75) Inventors: Yuming Zhou, Lakeville, MN (US); Feng Wang, Lakeville, MN (US); Jim Giusti, Chanhassen, MN (US); Juan Fernandez-de-Castro, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/572,664

(22) Filed: May 16, 2000

Related U.S. Application Data

(60) Provisional application No. 60/169,193, filed on Dec. 6, 1999.

(51) Int. Cl.⁷ .................................................. G11B 5/31
(52) U.S. Cl. ....................................................... 360/126
(58) Field of Search ................................ 360/125, 126, 360/317

(56) References Cited

U.S. PATENT DOCUMENTS

| | | | |
|---|---|---|---|
| 3,591,729 A | 7/1971 | Camras | 179/100.2 |
| 5,239,435 A | 8/1993 | Jeffers et al. | 360/126 |
| 5,331,728 A | 7/1994 | Argyle et al. | 29/603 |
| 5,423,116 A | 6/1995 | Sundaram | 29/603 |
| 5,428,893 A | 7/1995 | Mallory | 29/603 |
| 5,436,781 A * | 7/1995 | Matono et al. | 360/126 |
| 5,546,650 A | 8/1996 | Dee | 29/603.16 |
| 5,650,897 A | 7/1997 | Cohen et al. | 360/126 |
| 5,940,253 A | 8/1999 | Mallary et al. | 360/126 |

FOREIGN PATENT DOCUMENTS

| | | | |
|---|---|---|---|
| JP | 2-94011 | * | 4/1990 |
| JP | 4-44609 | * | 2/1992 |
| JP | 4-229406 | * | 8/1992 |
| JP | 11-39610 | * | 2/1999 |

* cited by examiner

*Primary Examiner*—David L. Ometz
(74) *Attorney, Agent, or Firm*—Kinney & Lange, P.A.

(57) ABSTRACT

A magnetic recording head has an air bearing surface and a magnetic core having a height and a width. The magnetic core is formed in part of a plurality of narrow slices having a plurality of insulating channels interspersed therein along the width of the magnetic core. Each of the plurality of narrow slices extends essentially along the height of the magnetic core.

20 Claims, 8 Drawing Sheets

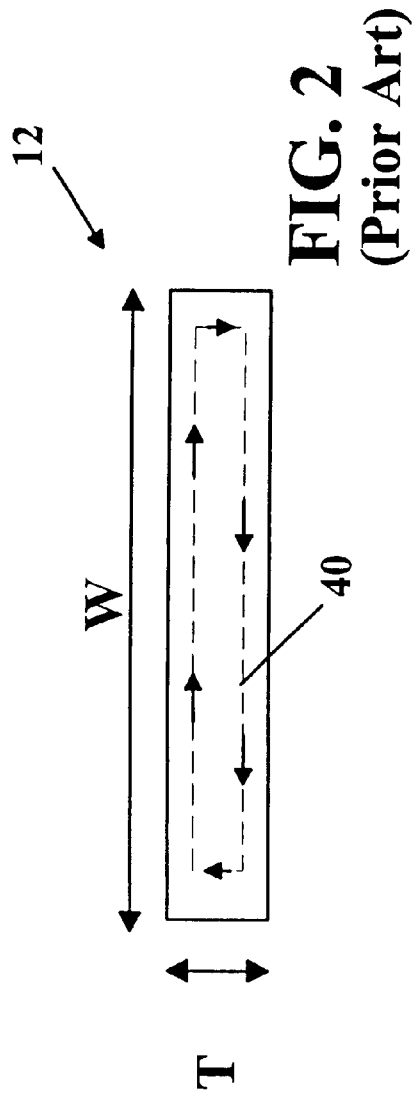
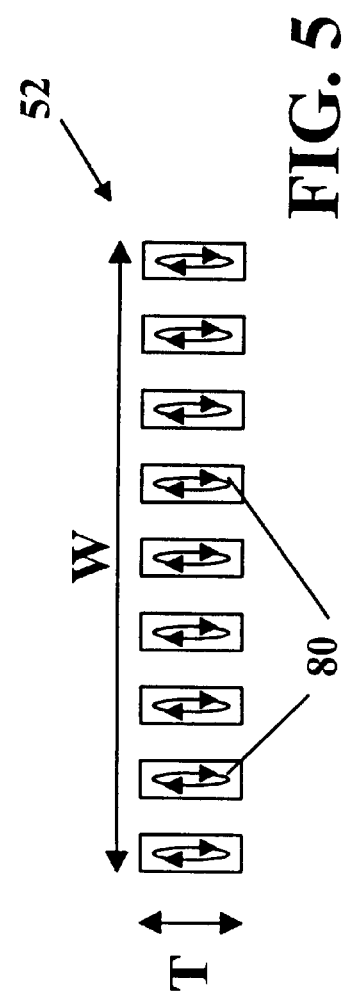

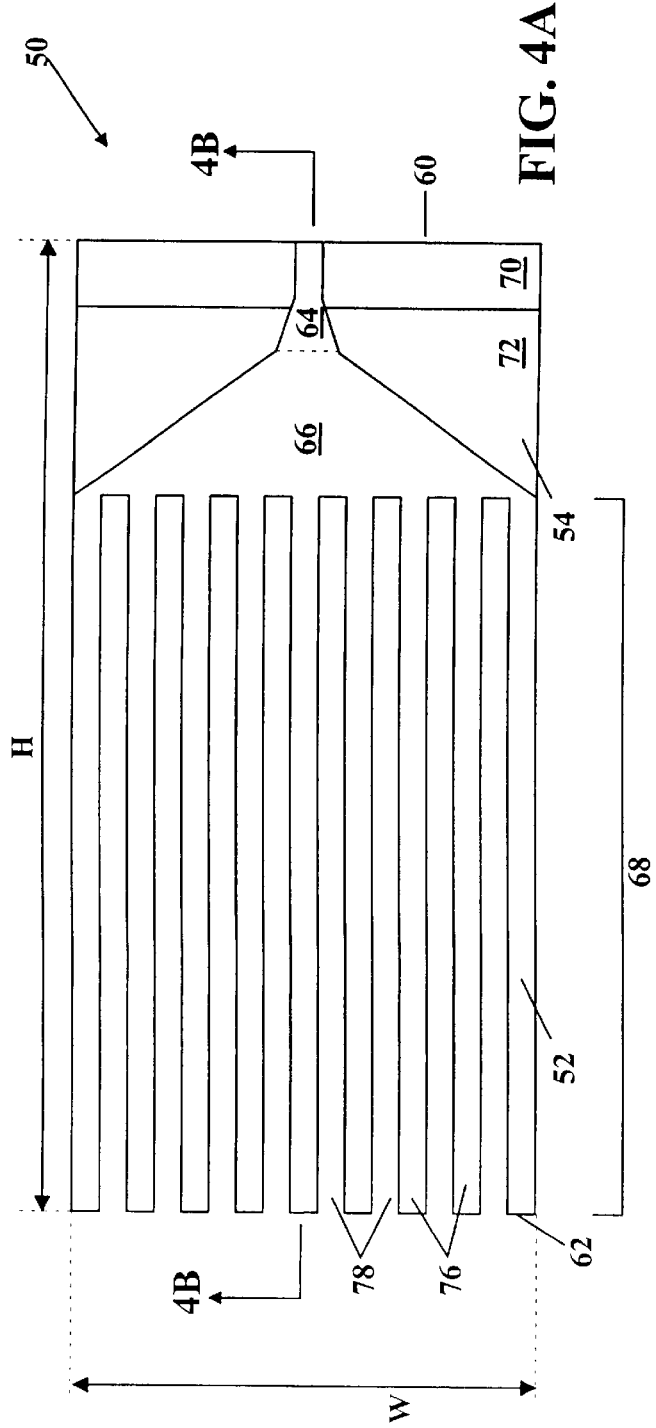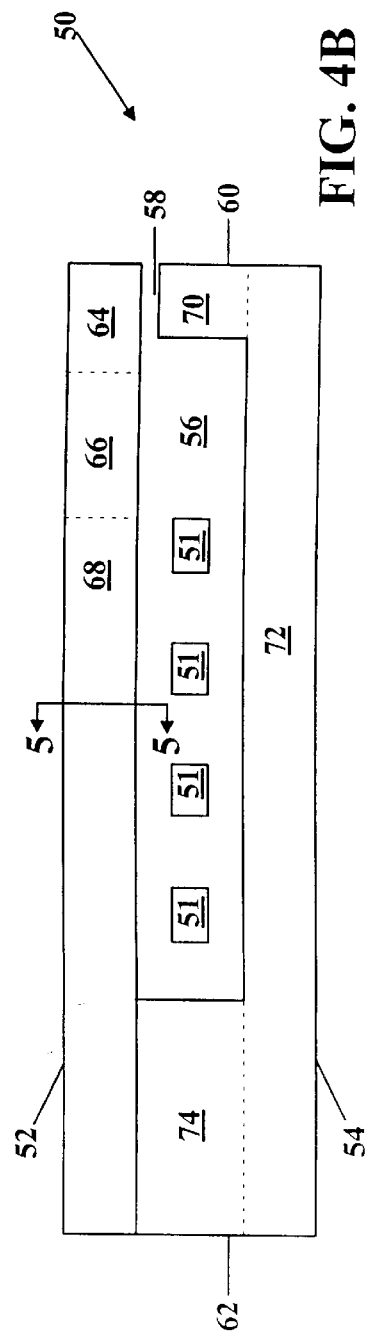
FIG. 4A
FIG. 4B

HIGH FREQUENCY WRITER WITH SLICED CORE TOPOLOGY

CROSS-REFERENCE TO RELATED APPLICATION(S)

This Application claims priority from provisional application No. 60/169,193, filed Dec. 6, 1999 for "High Frequency Writer with Sliced Core Topology (SCT)" of Yuming Zhou, Feng Wang, Jim Giusti and Juan Fernandez-de-Castro.

BACKGROUND OF THE INVENTION

The present invention relates generally to the field of magnetic data storage and retrieval. In particular, the present invention relates to a high frequency writer having a sliced core topology to minimize eddy current effects in the writer core.

A typical magnetic recording head consists of two portions: a writer portion for storing magnetically-encoded information on a magnetic disc and a reader portion for retrieving that magnetically-encoded information from the disc. The reader typically consists of two shields and a magnetoresistive (MR) sensor. positioned between the shields. Magnetic flux, from the surface of the disc causes rotation of the magnetization vector of a sensing layer of the MR sensor, which in turn causes a change in electrical resistivity of the MR sensor. This change in resistivity of the MR sensor can be detected by passing a current through the MR sensor and measuring a voltage across the MR sensor. External circuitry then converts the voltage information into an appropriate format and manipulates that information as necessary.

The writer typically consists of two magnetic poles, or a magnetic core, separated from each other at an air bearing surface of the write head by a write gap and connected to each other at a region away from the air bearing surface by a back via. Positioned between the two poles are one or more layers of conductive coils encapsulated by insulating layers. The writer and the reader are often arranged in a merged configuration in which a shared pole serves as both a shield in the reader and a magnetic pole in the writer.

To write data to the magnetic media, a time-varying electrical current, or write current, is caused to flow through the conductive coils. The write current produces a time-varying magnetic field in the magnetic poles. The magnetic field bridges the write gap forming a write gap field. The magnetic media is passed over the air bearing surface of the writer at a predetermined distance such that the magnetic surface of the media passes through the gap field. As the write current changes, the write gap field changes in intensity and direction.

As the write gap field changes directions, a counteracting flow of current is induced in the magnetic core. This induced current, which is known as an eddy current, attempts to oppose or reduce the change in magnetic flux. Eddy currents have a negative effect on the performance of the magnetic recording head. First, the eddy currents act as a shield to prevent external fields from penetrating the magnetic core, thereby reducing the efficiency of the recording head. Second, the eddy currents hinder the propagation of magnetic flux through the magnetic core, thereby causing a delay in the rise of magnetic flux at the writer gap. This increases phase lag between the magnetic flux and the magnetic field fringing out at the writer gap reduces the efficiency of the magnetic recording head.

As the frequency of the write current through the recording head increases to allow for increased data storage rates and densities, eddy currents have even more pronounced effects. It is well known that the inefficiency of the magnetic recording head increases in proportion to the square of the operating frequency. Accordingly, there is a need to reduce the occurrence of eddy currents in the recording head's magnetic core.

One common prior art attempt to reduce eddy current effects is to increase the resistivity of the material forming the magnetic core. Higher resistivity materials, however, generally have lower saturation moments, which result in the recording head having a reduced efficiency. Additionally, recording heads made of lower saturation moment materials are not capable of recording on higher density recording media.

A second common prior art approach to reducing eddy current effects is to form the core of horizontal laminations of thin films which alternate between thin films of traditional core materials and thin films of electrically insulating materials. However, the choice of a multi-layer lamination for the core will increase manufacturing costs because sputtering, rather than plating, technology must be employed for the deposit of traditional core materials on electrically insulating materials.

Accordingly, there is a need for a new method of reducing eddy current effects in a writer core to allow for a cost-efficient, high frequency writer.

BRIEF SUMMARY OF THE INVENTION

The present invention is a high frequency recording head having a sliced core topology which reduces the effects of eddy currents in the recording head. A magnetic recording head of the present invention has an air bearing surface and a magnetic core having a height and a width. The magnetic core is formed in part of a plurality of narrow slices having a plurality of insulating channels interspersed therein along the width of the magnetic core. Each of the plurality of narrow slices extends essentially along the height of the magnetic core.

In a preferred embodiment of the present invention, the magnetic core is formed of a top magnetic pole and a bottom magnetic pole. Each of the top and bottom magnetic poles has an air bearing surface and a back surface opposite the air bearing surface. The bottom magnetic pole is separated from the top magnetic pole at the air bearing surfaces by a write gap, and is in contact with the top magnetic pole at the back surfaces. In the top magnetic pole, each of the plurality of insulating channels extends from the back surface of the top magnetic pole toward the air bearing surface of the top magnetic pole. Similarly in the bottom magnetic pole, each of the plurality of insulating channels extends from the back surface of the bottom magnetic pole toward the air bearing surface of the bottom magnetic pole.

BRIEF DESCRIPTION OF THE DRAWINGS

FIG. 2 is a cross-sectional drawing illustrating the path of eddy currents in a top pole of the prior art magnetic recording head of FIGS. 1A–1B.

FIG. 4A is a top view of a magnetic recording head in accord with the present invention.

FIG. 4B is a cross-sectional view of the magnetic recording head of FIG. 4A taken along plane 4B—4B.

FIG. 5 is a cross-sectional drawing illustrating the path of eddy currents in a top pole of the magnetic recording head core of FIGS. 4A–4C.

DETAILED DESCRIPTION

Figure 1A:
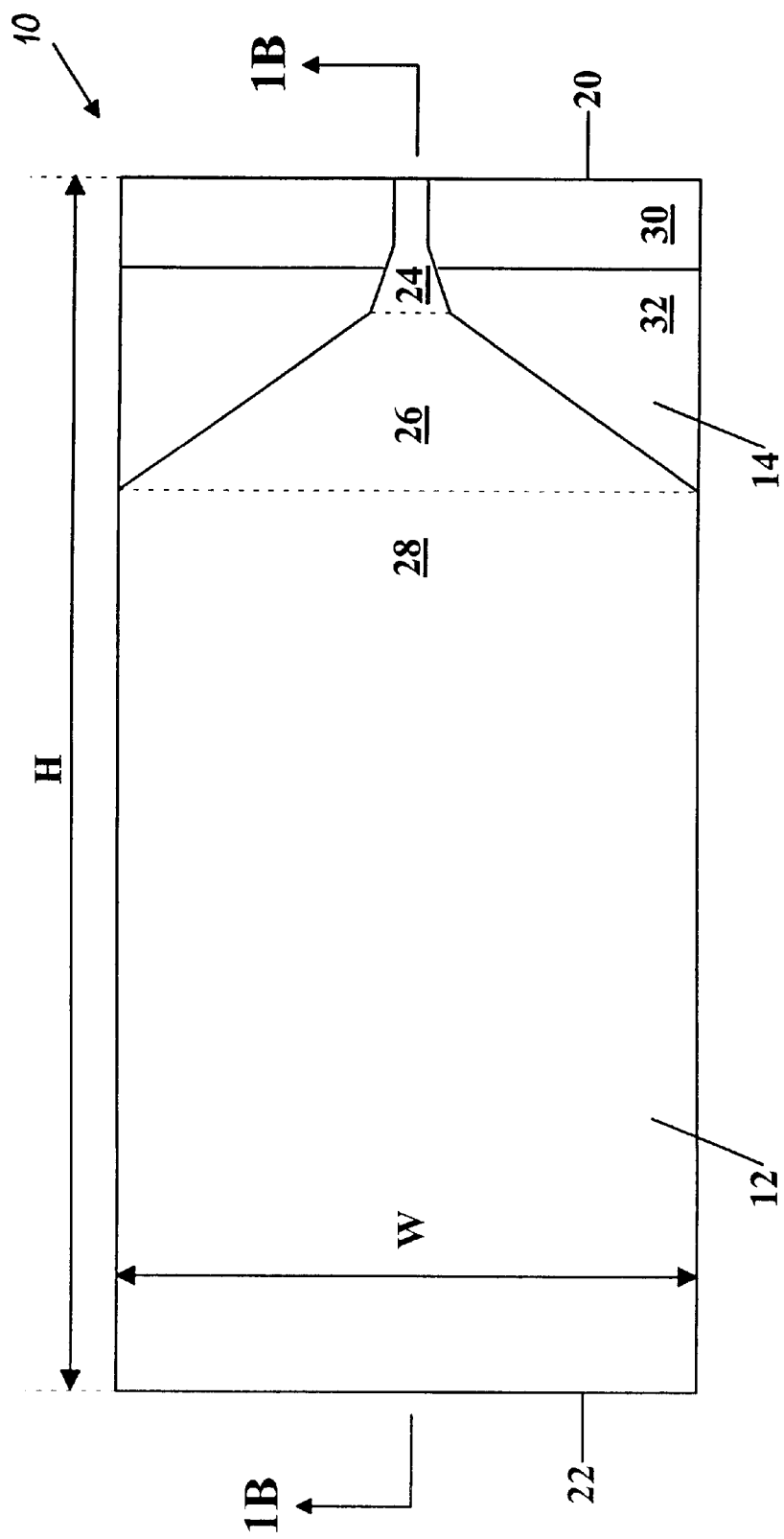
FIG. 1A is a top view of a prior art magnetic recording head.
Figure 1B:
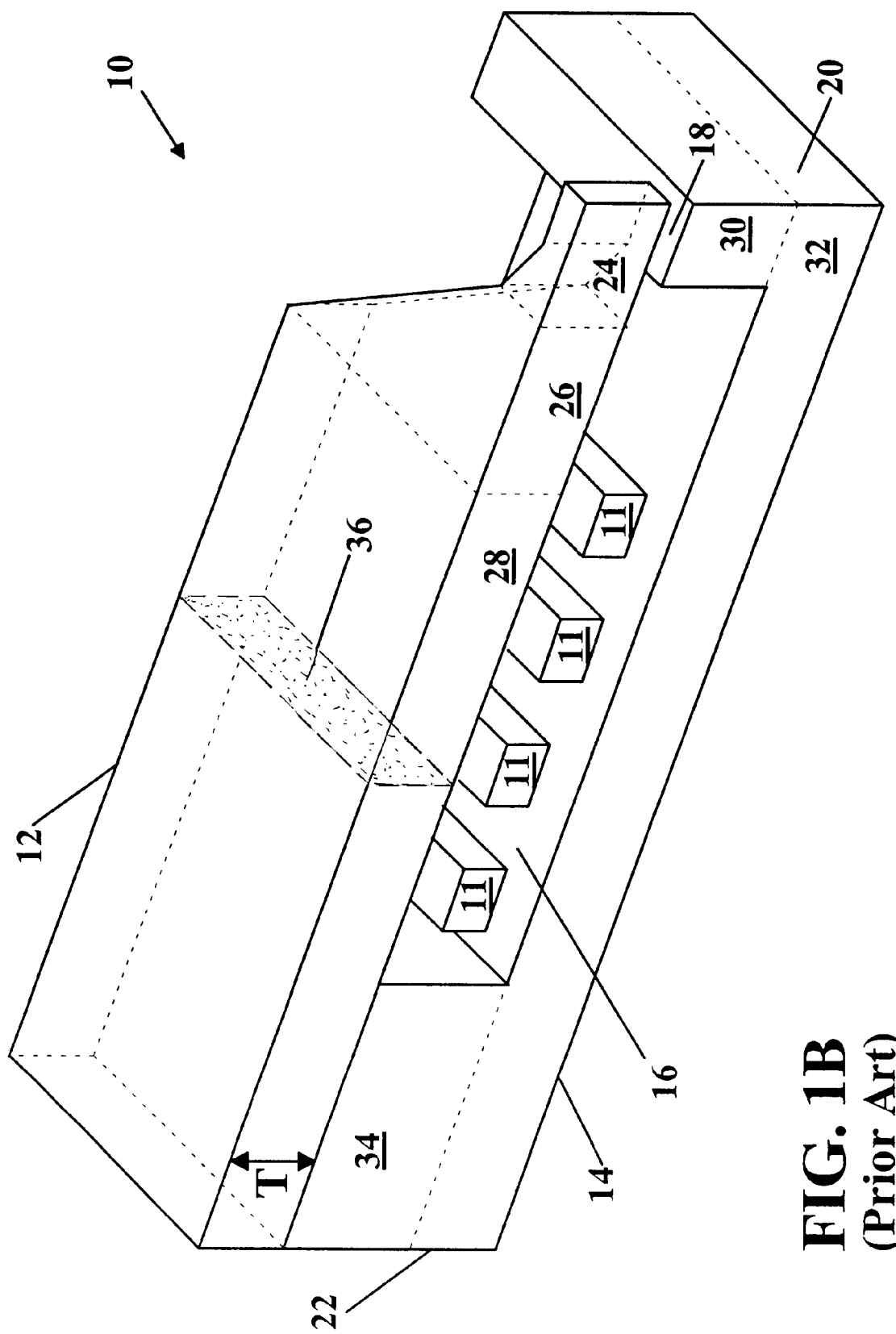
FIG. 1B is a perspective view of the prior art magnetic recording head of FIG. 1A taken along plane 1B—1B.

FIG. 1A is a top view of prior art magnetic recording head 10. FIG. 1B is a perspective view of one-half of magnetic recording head 10 which has been sliced in half along plane 1B—1B.

Magnetic recording head 10 includes conductive coils 11 and a magnetic core formed of top magnetic pole 12 and bottom magnetic pole 14. Conductive coils 11, which are positioned in cavity 16 between top pole 12 and bottom pole 14, are encapsulated in an insulating material (not shown in FIGS. 1A–1B) to insulate conductive coils 11 from the magnetic core. Write gap 18 is defined at air bearing surface (ABS) 20 of magnetic recording head 10 between terminating ends of top pole 12 and bottom pole 14. Flow of electrical current through conductive coils 11 generates a magnetic field across write gap 18. Conductive coils 11 may be arranged in either a horizontal pancake coil configuration or in a vertical toroidal coil configuration.

Top pole 12 is patterned to channel magnetic flux toward ABS 20 of magnetic recording head 10. Top pole 12, which has back surface 22 opposite, ABS 20, is formed of pole tip region 24 adjacent ABS 20, neck region 26 and paddle region 28 adjacent back surface 22. Neck region 26 is between pole tip region 24 and paddle region 28. Pole tip region 24 has a width which is narrower than a width of paddle region 28 to thereby define a narrower track width of magnetic recording head 11. A width of neck region 26 transitions from the narrow width of pole tip region 24 to the wide width of paddle region 28.

Bottom pole 14, which has back surface 22 opposite ABS 20, is formed of pole tip region 30 adjacent air bearing surface 20, paddle region 32 and back via region 34 adjacent back surface 22. Paddle region 32 is substantially between pole tip region 30 and back via region 34. Write gap 18 is between pole tip region 24 of top pole 12 and pole tip region 30 of bottom pole 14. Top pole 12 contacts bottom pole 14 at back via region 34 of bottom pole 14.

To write data to a magnetic medium, such as a magnetic disc, (not shown in FIGS. 1A–1B), a time-varying electrical current, or write current, is caused to flow through conductive coils 11. The magnetic field bridges write gap 18 forming a write gap field. The magnetic disc is passed over the ABS of magnetic. recording head 10 at a predetermined distance such that the magnetic surface of the disc passes through the gap field. As the write current changes, the write gap field changes in intensity and direction.

As the write gap field changes directions, a counteracting flow of current is induced in magnetic recording head 10. This induced current, which is known as an eddy current, attempts to oppose or reduce the change in magnetic flux.

FIG. 2 is a cross-sectional view of top pole 12 of prior art magnetic recording head 10 of FIG. 1B taken along plane 36. FIG. 2 illustrates path 40 of eddy current in top pole 12. The cross-section of FIG. 2 is taken in a plane parallel to ABS 20 of magnetic recording head 10. A similar cross-section of bottom pole 14 would result in a similar eddy current path therethrough.

These eddy currents have a negative effect on the performance of the magnetic recording head. First, the eddy currents act as a shield to prevent external fields from penetrating magnetic recording head 10, thereby reducing the efficiency of recording head 10. Second, the eddy currents hinder the propagation of magnetic flux through magnetic recording head 10, thereby causing a delay in the rise of magnetic flux at write gap 18. This increases phase lag between the magnetic flux and the magnetic field fringing out at write gap 18 reduces the efficiency of the magnetic recording head.

As the frequency of the write current through magnetic recording head 10 increases to allow for increased data storage rates and densities, these eddy current effects have an even more pronounced effect since the inefficiency of magnetic recording head 10 increases in proportion to the square of the operating frequency.

Figure 3:
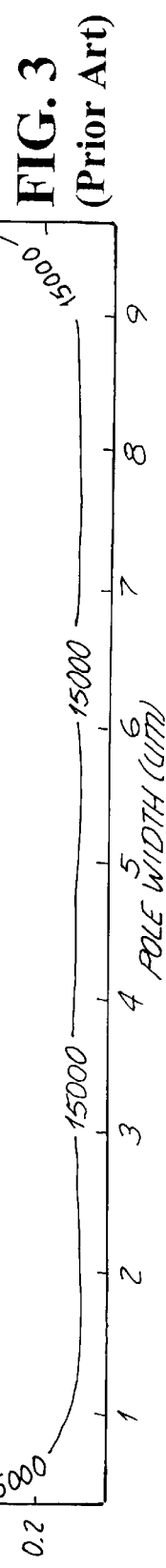
FIG. 3 is a contour plot of magnetic flux density in the cross-section illustrated in FIG. 2 of the prior art magnetic recording head of FIGS. 1A–1B.

FIG. 3 is a contour plot of magnetic flux density in top magnetic pole 12 of FIG. 2, in which width W of top pole 12 is on the horizontal axis and thickness T is on the vertical axis. To generate the contour plot of FIG. 3, a magnetic core was formed of a material similar in properties to $Ni_{45}Fe_{55}$ and was operated at 500 MHz. $Ni_{45}Fe_{55}$ is commonly used as a magnetic core material in magnetic recording heads due to its relatively high permeability, saturation magnetization, and resistivity. As is evident in FIG. 3, magnetic flux density is non-uniform in magnetic pole 42, and in fact, there is a central region 42 of top pole 12 (encircled by innermost curve 44) in which no magnetic flux is conducted. The high frequency results in an undesirable reduction in magnetic field penetration depth (skin depth).

As the frequency of write current through magnetic recording head 10 increases to allow for increased data storage rates and densities, this eddy current effect will become more pronounced. Accordingly, there is a need to reduce the, occurrence of eddy currents in magnetic recording head 10.

Figure 4C:
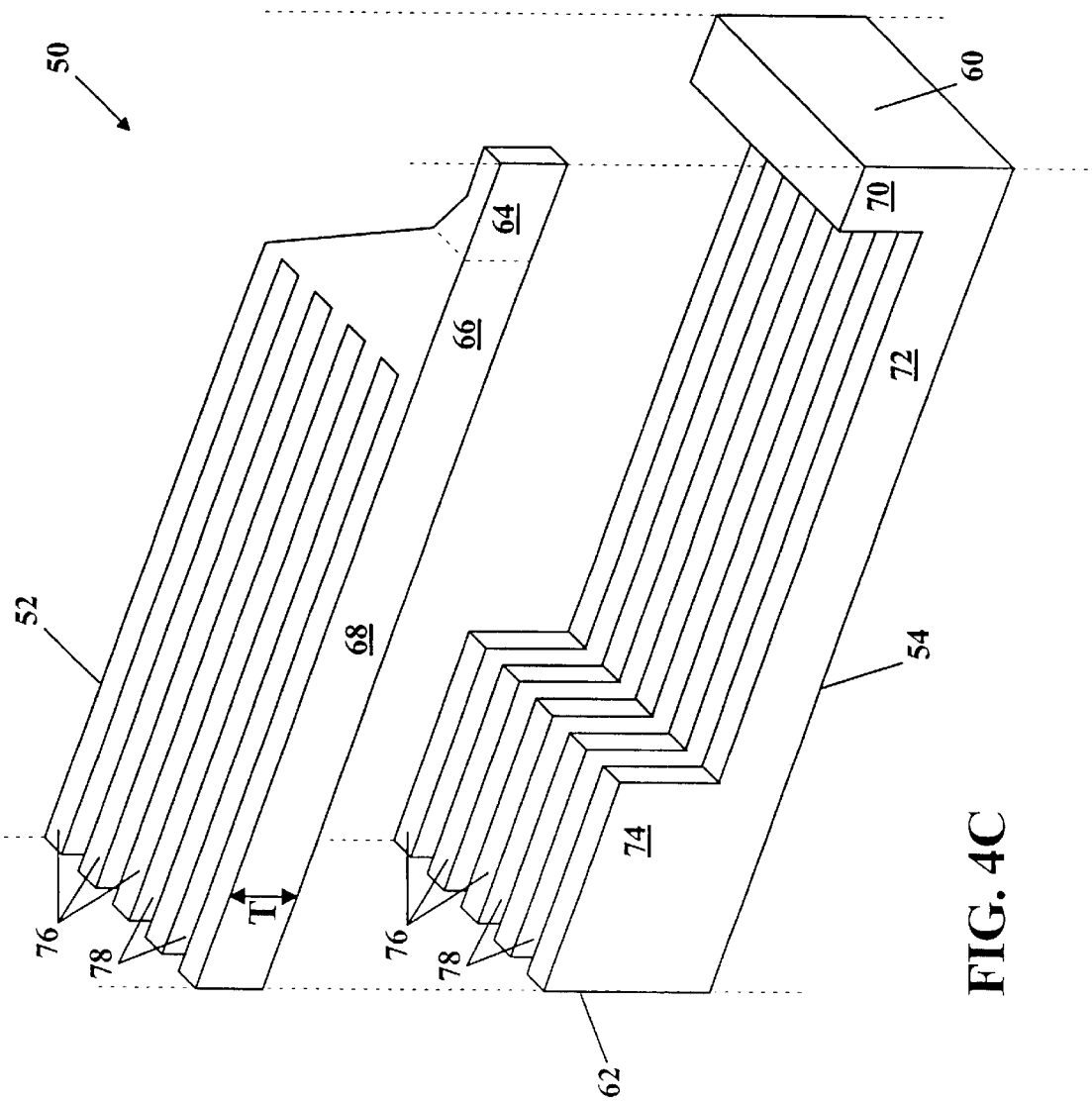
FIG. 4C is a perspective view of a magnetic core of the magnetic recording head of FIG. 4A taken along plane 4B—4B, wherein a top pole of the magnetic core is separated from a bottom pole of the magnetic core.

FIG. 4A is a top view of magnetic recording head 50 in accord with the present invention. FIG. 4B is a cross-sectional view of magnetic recording head 50 taken along plane 4B—4B. FIG. 4C is a perspective view of one-half of magnetic recording head 50 which has been sliced in half along plane 4B—4B.

Magnetic recording head 50 includes conductive coils 51 and a magnetic core formed of top magnetic pole 52 and bottom magnetic pole 54. Conductive coils 51, which are positioned in cavity 56 between top pole 52 and bottom pole 54, are encapsulated in an insulating material (not shown in FIGS. 4A–4C) to insulate conductive coils 51 from the magnetic core. Write gap 58 is defined at air bearing surface (ABS) 60 of magnetic recording head 50 between terminating ends of top pole 52 and bottom pole 54. Flow of electrical current through conductive coils 51 generates a magnetic field across write gap 58. Conductive coils 51 can be arranged in either a horizontal pancake coil configuration or in a vertical toroidal coil configuration.

Top pole 52 is patterned to channel magnetic flux toward ABS 60 of magnetic recording head 50. Top pole 52, which has back surface 62 opposite ABS 60, is formed of pole tip region 64 adjacent ABS 60, neck region 66 and paddle region 68 adjacent back surface 62. Neck region 66 is between pole tip region 64 and paddle region 68. Pole tip region 64 has a width which is narrower than a width of paddle region 68 to thereby define a narrower track width of magnetic recording head 50. A width of neck region 66 transitions from the narrow width of pole tip region 64 to the wide width of paddle region 68.

Bottom pole 54, which has back surface 62 opposite ABS 60, is formed of pole tip region 70 adjacent ABS 60, paddle region 72 and back via region 74 adjacent back surface 62. Paddle region 72 is substantially between pole tip region 70 and back via 74 region. Write gap 58 is between pole tip region 64 of top pole 52 and pole tip region 70 of bottom pole 54. Top pole 52 contacts bottom pole 54 at back via region 74 of bottom pole 54.

Paddle region 68 of top pole 52, paddle region 72 of bottom pole 54 and back via region 74 of bottom pole 54 are each formed of a plurality of narrow slices 76 having a plurality of insulating channels 78 interspersed therein along a width W of magnetic recording head 50. The arrangement of slices 76 and insulating channels 78 have a comb-like appearance in which slices 76 are the comb's teeth, or fingers, and insulating channels 78 are the spaces between the teeth. Slices 76 extend essentially along a length L of magnetic recording head 50, substantially normal to ABS 60. Similarly, insulating channels 78 extend essentially along a length L of magnetic recording head 50 through an entire thickness T of the corresponding region of top and bottom poles 52 and 54. Insulating channels 78 extend from back surface 62 of corresponding top or bottom pole 52 or 54 toward air bearing surface 60 of magnetic recording head 50. Preferably, each of the plurality of insulating channels is filled with an insulating material, such as alumina or cured photoresist.

To write data to a magnetic media (not shown in FIGS. 4A–4C), a time-varying electrical current, or write current, is caused to flow through conductive coils 51. The magnetic field bridges write gap 58 forming a write gap field. The magnetic media is passed over ABS 60 of magnetic recording head 50 at a predetermined distance such that the magnetic surface of the media passes through the gap field. As the write current changes, the write gap field changes in intensity and direction.

As the write gap field changes directions, a counteracting flow of current, or an eddy current, is induced in magnetic core 50 to attempt to oppose or reduce the change in magnetic flux.

FIG. 5 is a cross-sectional view of top pole 52 of magnetic recording head 50 taken along plane 5—5. FIG. 5 illustrates path 80 of eddy current in top pole 52. The cross-section of FIG. 5 is taken in a plane parallel to ABS 60 of magnetic recording head 50. A similar cross-section of bottom pole 54 would result in a similar eddy current path therethrough.

A comparison of FIG. 5 and FIG. 2 illustrates how the sliced core topology of magnetic recording head 50 of the present invention is an improvement over the prior art. By introducing insulating channels 78, eddy current path 80 is limited to the smaller sections of magnetic pole 52, rather than relatively large eddy current path 40 of prior art magnetic pole 42.

Figure 6:
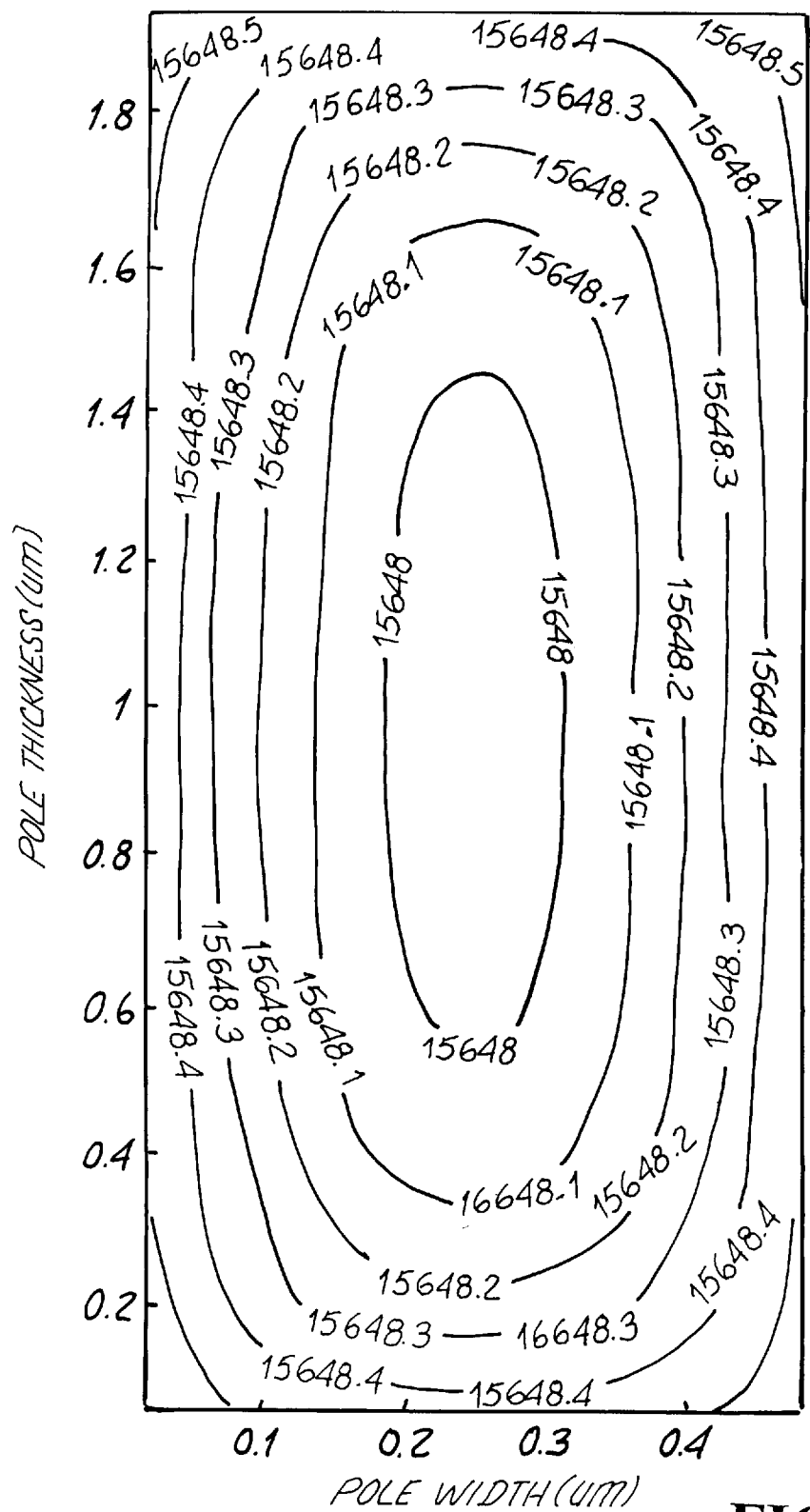
FIG. 6 is a contour plot of magnetic flux density in the cross-section illustrated in FIG. 5 of the magnetic recording head core of FIGS. 4A–4C.

FIG. 6 further illustrates the improvement offered by the sliced core topology of magnetic recording head 50 of the present invention over the prior art. FIG. 6 is a contour plot of magnetic flux density in a single slice 76 of top pole 52 of FIG. 5, in which the width of slice 76b of top pole 52 is on the horizontal axis and thickness T of top pole 52 is on the vertical axis. To generate the contour plot of FIG. 5, a core was formed of a material similar in properties to $Ni_{45}Fe_{55}$ and was operated at 500 MHz. $Ni_{45}Fe_{55}$ is commonly used as a magnetic core material in magnetic recording heads due to its relatively high permeability, saturation magnetization, and resistivity. Contrary to the results in FIG. 3 for prior art top pole 12, the magnetic flux density is nearly uniform in top pole 52.

This sliced core topology of magnetic recording head 50 offers several advantages over prior art magnetic recording head recording head 10 of FIGS. 1–3. First, the eddy current effect is significantly reduced because insulating channels 78, which are interspersed between slices 76, interrupt the eddy current path in the magnetic core. Second, the process of forming magnetic core 50 with the sliced core topology can be implemented in a much simpler fashion than horizontal laminations. Horizontal laminations must be formed by a sputtering-type deposition process, rather than a plating-type deposition process, whereas, the magnetic core of magnetic recording head 50 having a sliced core topology can be formed by a plating-type process in combination with a photoresist masking process to shape the slices. This subsequent masking process can be combined with the mask used to shape the pole tips. Thus, the sliced core topology of magnetic recording head 50 of the present invention does not require any substantial deviation from current manufacturing techniques.

With the minimization of the eddy current, the eddy-current power loss, which is proportional to the square of the frequency and the square of the width of the core, is also reduced significantly at high frequency, thereby lowering the temperature rise in the core. Moreover, the head conduction resistance in the core is high due to the reduced cross-sectional area of the core. All of these help to reduce the thermal pole tip recession because the heat transferred from the core towards the pole tips at the ABS is reduced.

To achieve these advantages, slices 76 in top and bottom magnetic poles 52 and 54 are preferably spaced periodically across width W of the magnetic core of magnetic recording head 50. The width of each of the plurality of insulating channels 78 is preferably selected so that the width of each of the plurality of slices 76 is approximately two times the skin depth of the magnetic core at the desired operating frequency.

Figure 7:
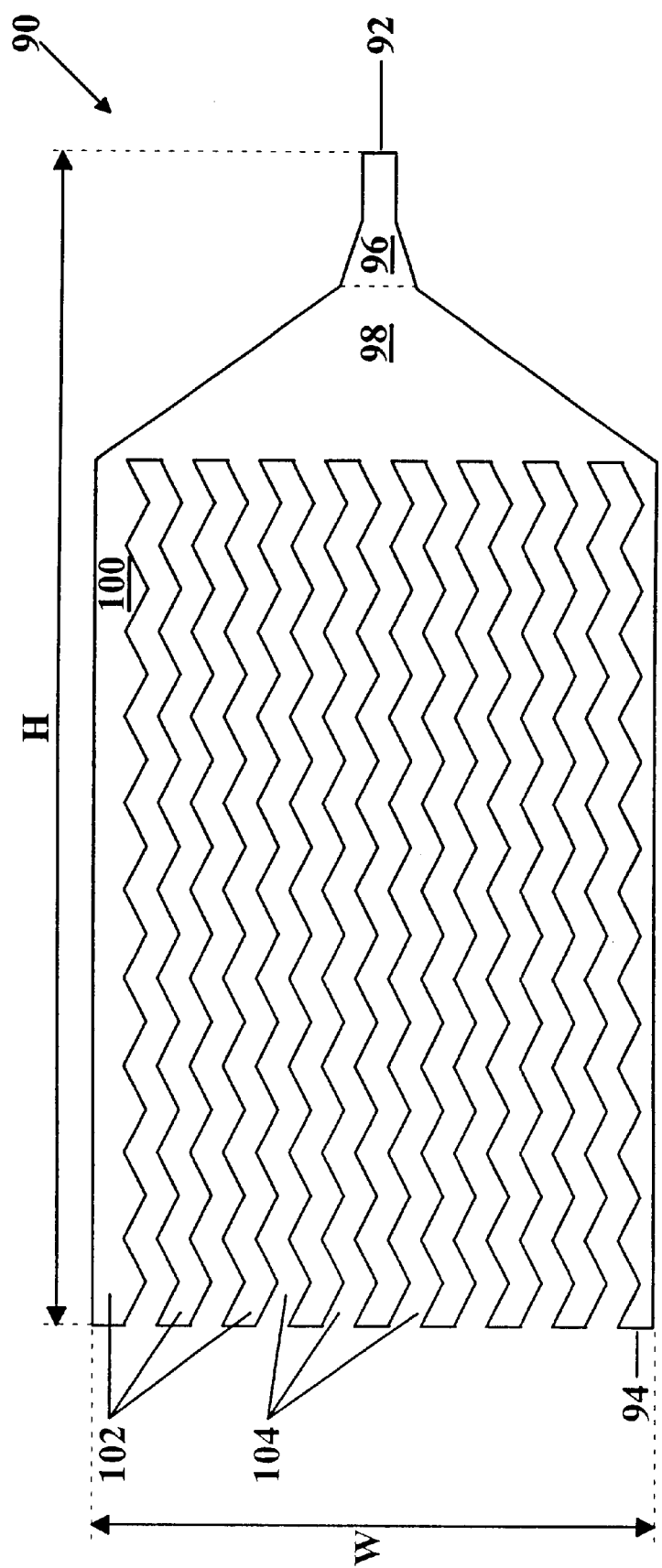
FIG. 7 is a top view of a magnetic recording head having an alternate embodiment of the present invention.

FIG. 7 is a top view of a magnetic recording head having an top magnetic pole 90 having an alternate embodiment of the sliced core topology of the present invention. Top pole 90 has ABS 92, back surface 94 opposite ABS 92, pole tip region 96 adjacent ABS 92, neck region 98 and paddle region 100 adjacent back surface 94. Neck region 98 is between pole tip region 96 and paddle region 100.

Paddle region 100 is formed of a plurality of slices 102 having a plurality of insulating channels 104 interspersed therein along a width W of top magnetic pole 90. Slices 102 extend essentially along height H of top pole 90. Insulating channels 104 extend from back surface 94 of top pole 90 toward ABS 92. Slices 102 are zigzag-shaped to illustrate that the actual geometry of slices 102 is not limited to planar slices. Rather, slices 102 may be curved or zigzag-shaped. Different shapes of slices 102 may result in reduction of demagnetization effects caused by the geometric shapes of slices 102. The optimal shape and dimensions of slices 102 should be determined by conventional finite element analysis based upon the core material properties and the operating frequency.

In summary, the present invention allows for the reduction of eddy current effect in a magnetic recording head, without significantly complication the manufacturing process of the magnetic recording head. Thus, the present invention is particularly useful in high frequency applications.

Although the present invention has been described with reference to preferred embodiments, workers skilled in the art will recognize that changes may be made in form and detail without departing from the spirit and scope of the invention.

What is claimed is:

1. A magnetic recording head having an air bearing surface and comprising a conductive coil having a plurality of windings and a magnetic core having a height and a width, the magnetic core comprised in part of a plurality of narrow slices having a plurality of insulating channels interspersed therein along the width of the magnetic core, wherein each of the plurality of narrow slices extends essentially along the height of the magnetic core, and wherein each winding of the conductive coil wraps around the width of the magnetic core.

2. The magnetic recording head of claim 1 wherein the magnetic core comprises:
    a top magnetic pole having a back surface opposite the air bearing surface, wherein each of the plurality of insulating channels extends from the back surface of the top magnetic pole toward the air bearing surface of the top magnetic pole; and
    a bottom magnetic pole having a back surface opposite the air bearing surface, the bottom magnetic pole being separated from the top magnetic pole at the air bearing surface by a write gap and in contact with the top magnetic pole at the back surface, wherein each of the plurality of insulating channels extends from the back surface of the bottom magnetic pole toward the air bearing surface of the bottom magnetic pole.

3. The magnetic recording head of claim 2 wherein the top magnetic pole comprises a pole tip region adjacent the air bearing surface, a paddle region adjacent the back surface and a neck region between the pole tip region and the paddle region, and wherein none of the plurality of insulating channels extends through either the pole tip region or the neck region of the top magnetic pole.

4. The magnetic recording head of claim 2 wherein the bottom magnetic pole comprises a pole tip region adjacent the air bearing surface and a paddle region adjacent the back region, and wherein none of the plurality of insulating channels extends through the pole tip region of the bottom magnetic pole.

5. The magnetic recording head of claim 1 wherein each of the plurality of narrow slices is substantially planar in shape.

6. The magnetic recording head of claim 1 wherein each of the narrow slices is zigzag-shaped.

7. The magnetic recording head of claim 1 wherein the plurality of narrow slices of the magnetic core is periodically spaced across the width of the magnetic core.

8. The magnetic recording head of claim 1 wherein each of the plurality of insulating channels is formed of an insulating material.

9. The magnetic recording head of claim 8 wherein the insulating material is alumina.

10. The magnetic recording head of claim 8 wherein the insulating material is cured photo-resist.

11. A magnetic recording head having an air bearing surface and comprising:
    a top magnetic pole having a pole tip region adjacent the air bearing surface, a paddle region opposite the air bearing surface and a neck region between the pole tip region and the paddle region, wherein the paddle region of the top magnetic pole is formed of a plurality of narrow slices having a plurality of insulating channels interspersed therein along a width of the magnetic recording head;
    a bottom magnetic pole having a pole tip region adjacent the air bearing surface and a paddle region opposite the air bearing surface, the pole tip region of the bottom magnetic pole being separated by a write gap from the pole tip region of the top magnetic pole, and a back portion of the paddle region of the bottom magnetic pole being in contact with a back portion of the paddle region of the top magnetic pole; wherein the paddle region of the bottom magnetic pole is formed of a plurality of narrow slices having a plurality of insulating channels interspersed therein along the width of the magnetic recording head; and
    a conductive coil formed of a plurality of windings, the conductive coil being positioned in part between the top magnetic pole and the bottom magnetic pole, wherein each winding of the conductive coil wraps around at least one of the top magnetic pole and the bottom magnetic pole.

12. The magnetic recording head of claim 11 wherein the plurality of narrow slices forming the paddle regions of the top and bottom magnetic poles are substantially planar in shape.

13. The magnetic recording head of claim 11 wherein the plurality of narrow slices forming the paddle regions of the top and bottom magnetic poles are substantially zigzag-shaped.

14. The magnetic recording head of claim 11 wherein the plurality of narrow slices forming the paddle regions of the top and bottom magnetic poles are spaced periodically across the width of the top and bottom magnetic poles.

15. The magnetic recording head of claim 11 wherein the insulating channels are formed of an insulating material.

16. The magnetic recording head of claim 15 wherein the insulating material is alumina.

17. The magnetic recording head of claim 15 wherein the insulating material is cured photo-resist.

18. A magnetic recording head having an air bearing surface and comprising a conductive coil and a magnetic core having a height and a width, the magnetic core comprised in part of a plurality of narrow slices having a plurality of insulating channels interspersed therein along the width of the magnetic core, wherein each of the plurality of narrow slices extends essentially along the height of the magnetic core, wherein a width of each insulating channel equals about two times a skin depth of the magnetic core at a desired operating frequency and wherein the conductive coil wraps around the width of the magnetic core.

19. A magnetic recording head having an air bearing surface and comprising:
    a top magnetic pole having a pole tip region adjacent the air bearing surface, a paddle region opposite the air bearing surface and a neck region between the pole tip region and the paddle region, wherein the paddle region of the top magnetic pole is formed of a plurality of narrow slices and having a plurality of insulating channels interspersed therein along a width of the magnetic recording head; wherein a width of each insulating channel of the top magnetic pole equals about two times a skin depth of the top magnetic pole at a desired operating frequency;
    a bottom magnetic pole having a pole tip region adjacent the air bearing surface and a paddle region opposite the air bearing surface, the pole tip region of the bottom magnetic pole being separated by a write gap from the pole tip region of the top magnetic pole, and a back portion of the paddle region of the top magnetic pole; wherein the paddle region of the bottom magnetic pole is formed of a plurality of narrow slices having a plurality of insulating channels interspersed therein along the width of the magnetic recording head wherein a width of each insulating channel of the bottom magnetic pole equals about two times a skin depth of the bottom magnetic pole at a desired operating frequency; and a conductive coil positioned in part between the top magnetic pole and the bottom magnetic pole, wherein the conductive coil wraps around at least one of the top magnetic pole and the bottom magnetic pole.

20. A magnetic recording head having an air bearing surface and comprising:

a magnetic core having a height and a width, the magnetic core formed in part of a plurality of narrow slices having a plurality of insulating channels interspersed therein along the width of the magnetic core, wherein each of the plurality of narrow slices extends essentially along the height of the magnetic core; and a conductive coil formed of a plurality of windings positioned such that each winding of the conductive coil wraps around the plurality of narrow slices.

* * * * *